(12) United States Patent
Komiyama

(10) Patent No.: US 8,511,566 B2
(45) Date of Patent: Aug. 20, 2013

(54) RFID LABEL AND RFID LABEL MANUFACTURING METHOD

(75) Inventor: Kiichi Komiyama, Tokyo (JP)

(73) Assignee: Sato Holdings Kabushiki Kaisha (JP)

( * ) Notice: Subject to any disclaimer, the term of this patent is extended or adjusted under 35 U.S.C. 154(b) by 0 days.

(21) Appl. No.: 13/258,541

(22) PCT Filed: Feb. 18, 2010

(86) PCT No.: PCT/JP2010/001043
§ 371 (c)(1),
(2), (4) Date: Sep. 22, 2011

(87) PCT Pub. No.: WO2011/092752
PCT Pub. Date: Aug. 4, 2011

(65) Prior Publication Data
US 2012/0012658 A1    Jan. 19, 2012

(30) Foreign Application Priority Data
Jan. 29, 2010 (JP) .................................. 2010-018941

(51) Int. Cl.
*G06K 19/00* (2006.01)
(52) U.S. Cl.
USPC .............................. 235/488; 235/487; 235/492
(58) Field of Classification Search
USPC .............................. 235/487, 492; 340/10, 572
See application file for complete search history.

(56) References Cited

U.S. PATENT DOCUMENTS

| | | | |
|---|---|---|---|
| 2007/0009732 A1* | 1/2007 | Tsai et al. | 428/349 |
| 2008/0173720 A1* | 7/2008 | Kato et al. | 235/492 |
| 2009/0002125 A1* | 1/2009 | Yamaguchi et al. | 340/5.1 |
| 2009/0045964 A1 | 2/2009 | Takeda et al. | |
| 2009/0236429 A1 | 9/2009 | Hioki | |

FOREIGN PATENT DOCUMENTS

| | | |
|---|---|---|
| EP | 2105870 | 9/2009 |
| JP | 2004-184514 | 7/2004 |
| JP | 2007-213329 A | 8/2007 |
| JP | 2008-18718 A | 1/2008 |
| JP | 2009-116608 A | 5/2009 |
| JP | 2009-169899 A | 7/2009 |
| JP | 2009-259183 A | 11/2009 |

OTHER PUBLICATIONS

International Search Report dated Apr. 6, 2010, issued in corresponding international application No. PCT/JP2010/001043.

* cited by examiner

*Primary Examiner* — Michael G Lee
*Assistant Examiner* — Matthew Mikels
(74) *Attorney, Agent, or Firm* — Ostrolenk Faber LLP

(57) ABSTRACT

A RFID label that has no wrinkle formed therein when the RFID label is unwound and fed from a roll or when printing is executed thereon by a label printer, and a manufacturing method therefor: The RFID label includes an adhesive paper sheet including a label base material and a first adhesive layer, an RFID inlet formed by disposing an IC and an antenna on one or both sides of a base material. The RFID inlet has a smaller area than that of the adhesive paper sheet. A second adhesive layer is disposed on a side of the RFID inlet that is opposite to that of the adhesive paper sheet, and a separator laminated therein. A gap line across the total thickness of the RFID label differs depending on the disposition of constituent members of the inlet. One or a plurality of cuts, each penetrating the separator, are each formed at a position at which the cut extends over the gap line or each cut is in the vicinity of the gap line.

20 Claims, 17 Drawing Sheets

(a)

( a )

(b)

(c)

(a)

(b)

( c )

RFID LABEL AND RFID LABEL MANUFACTURING METHOD

CROSS-REFERENCE TO RELATED APPLICATIONS

The present application is a 35 U.S.C. §§371 national phase conversion of PCT/JP2010/001043, filed Feb. 18, 2010, which claims priority of Japanese Application No. 2010-018941, filed Jan. 29, 2010, the contents of which are incorporated by reference herein. The PCT International Application was published in the Japanese language.

BACKGROUND OF THE INVENTION

1. Technical Field

The present invention relates to a RFID label embedded with an inlet having an integrated circuit (IC) and an antenna. More particularly, the present invention relates to a RFID label and a method for manufacturing the RFID label to avoid creating creases at the portions of the label with different total thicknesses such as at the periphery of the embedded inlet and around the IC.

2. Background Art

An RFID label 3 as depicted in FIG. 6 has recently been prevalent in use. The RFID label 3 is attached to a part, such as a piece of merchandise, a package thereof, etc., and is used by recording thereon information concerning e.g. the name and the histories of the product and to record thereon, transmit, and manage information e.g. concerning delivery, such as a delivery destination, of the part or the piece of merchandise on which the label is disposed. The RFID label 3 is comprised of an RFID inlet 22 sandwiched between an adhesive paper sheet 2 which is comprised of a label base material 6 and a first adhesive layer 7, on the one hand and a separator 8, on the other hand. The RFID inlet 22 includes an IC 19 that has data stored therein and an antenna 18 that is connected to the IC 19 and that transmits and receives information. The antenna is disposed on one or both sides of a base material 16. The RFID inlet 22 is temporarily attached to the separator 8 through a second adhesive layer 17.

The RFID label 3 incorporates the RFID inlet 22 between the label base material 6 and the separator 8. Therefore, specialized label manufacturing equipment is used that is dedicated to the RFID label 3 and that is different from a multi-purpose label manufacturing machine.

An example of a RFID label manufacturing apparatus 20 depicted in FIG. 7 sequentially laminates the inlet 22 and an adhesive paper sheet 61 on a separation face of the separator 8 and cuts the resultant label into a die, during conveying of the separator 8. The RFID label manufacturing apparatus 20 includes in the sequence an unwinding unit 30, apparatus for performing an inlet laminating process 50, apparatus for performing an adhesive paper sheet laminating process 60, apparatus for performing a die-cutting process 70, and a winding unit 80, a waste winding unit 90 along a forward direction conveyance path for the separator 8 in.

A wound up separator roll 32 of the separator 8 in attached to a supply shaft 31 of the unwinding unit 30.

The inlet laminating process 50 attaches inlets 22 supplied from an inlet continuous body 51 to the separator 8. The inlet continuous body 51 is formed by disposing inlets 22, each including an IC 19 that has data stored therein and an antenna 18 that transmits and receives information disposed on the surface of the base material 16. The inlets are disposed on a separator 58 at specific intervals. The inlets 22 are temporarily attached to the separator 58 through the second adhesive layer 17 and are attached to a supply shaft 52 where the separator is wound in a roll as the inlet continuous body 51. The inlet laminating process 50 is performed by the supply shaft 52 for the separator, a guide roller 53, about which the separator is guided and there is a separating plate 54 that turns the separator 58 at an acute angle to the upstream direction and that causes the inlets 22 to separate from the separator 58, a pair of rolls 55 that laminate the now separated inlets 22 on the separator 8, a guide roller 56 that guides the separator 58 after the inlets 22 have been separated therefrom, and a take-up shaft 57 that takes up the separator 58, along a path of the inlet continuous body 51 in its forward direction.

The adhesive paper sheet laminating process 60 comprises acquiring an RFID adhesive paper sheet 69 by causing the adhesive paper sheet 2 to adhere to the separator 8. An adhesive raw paper sheet roll 61 is a laminated body including a label base material 6, a second adhesive layer 7 and a separator 68. It is attached to a supply shaft 62 by being wound in a roll. The adhesive paper sheet laminating process 60 is performed by the supply shaft 62, a roller 63 around which the separator 68 turns and separates, a pair of rolls 64 that laminate the adhesive paper sheet 2 on the separator 68 to form an RFID adhesive paper sheet 69, and a take-up shaft 65 that takes up the separator 68 that has peeled off and is along a path for the adhesive raw paper sheet 61 in its forward direction.

The die-cutting process 70 causes a blade to enter the separator 8 from the label-base-material side and to cut the separator 8 into a die. For example, the RFID adhesive paper sheet 69 is sandwiched between a roll with a blade referred to as a dicing roll 71 and an anvil roll 72. The dicing roll 71 is pushed onto the label base material 6 and is rotated thereby forming a cutting line. A pair of waste collecting rolls 73 and 74 disposed downstream from the dicing roll 71 separate label waste 9 from the RFID adhesive paper sheet 69.

The RFID label 3 is processed as follows. The separator 8 is unwound and fed from the unwinding unit 30, to the inlet laminating process 50. The inlets 22 are temporarily attached at specific intervals on the separated face of the separator 8 by the second adhesive layer 17.

The laminated body of the separator 8 and the inlet 22 arrives at the adhesive paper sheet laminating process 60. The adhesive paper sheet 2 is further laminated on the laminated body and, thereby, the inlet 22 becomes part of the RFID adhesive paper sheet 69 that is sandwiched by the separator 8 and the adhesive paper sheet 2.

The RFID adhesive paper sheet 69 advances to the die-cutting process 70 where it, is cut into a die having a desired label size, by the dicing roll 71 causing its blade to enter the sheet 69 from the label-base-material side.

When label waste 9 surrounding the RFID label 3 are peeled off by the waste collecting roll 73, a label continuous body 10 is completed that has the RFID labels 3 depicted in FIG. 6 arranged therein at specific intervals. The label continuous body 10 from which waste has been collected is taken up by and wound on a take-up shaft 81 of the winding unit 80 passing through a guide roll 29 to form an RFID label roll 82. The label waste 9 that is collected is taken up by and wound on a take-up shaft 91 of the waste winding unit 90. Thereafter, the RFID label roll 82 is divided into small rolls each having a predetermined length of the label roll and a predetermined quantity of labels. Each of the small rolls is finished as the RFID label continuous body 10 in the roll depicted in FIG. 8. The RFID label continuous body 10 is issued after printing on the surface thereof by a label printer 150 depicted in FIG. 3 and after writing information into the IC 19.

FIG. 3 is a schematic side view of the label printer 150. The label printer 150 is provided with a roll paper sheet feeding unit 151 and a printing unit 161 in a housing 152. The RFID label continuous body 10 that is wound in a roll is rotatably supported around a shaft 155 of the roll paper sheet feeding unit 151. Along a traveling path for the label continuous body 10 in its forward direction, there are attached in sequence a guide bar 156, a paper sheet sensor 157 that detects the presence or absence of the label continuous body 10, a pitch sensor 158 that detects intervals between the labels, and a reader/writer 159 that transmits and receives information to/from the RFID label 3 by wireless communication. A printing unit 161 downstream of the above noted elements includes a platen roller 162, a thermal head 163 that pushes on and supports the label continuous body 10 together with the platen roller 162, and a cutter unit 164 present downstream of those elements. The housing 152 is provided with an issuing window 165 adjacent to the cutter unit 164.

When the platen roller 162 is rotated, the RFID label continuous body 10 that is unwound and fed arrives at the reader/writer 159 after passing the guide bar 156, the paper sheet sensor 157, and the pitch sensor 158. Information is recorded on the RFID label by wireless communication. The RFID label continuous body 10 arrives at the printing unit 161, and images such as characters and bar codes are printed by thermal scanning of the thermal head 163. After the printing, the RFID label is discharged to the exterior from the issuing window 165 as a continuous body or is cut one by one by the cutting unit 164.

The RFID label 3 includes the inlet 22 that has protrusions and recesses and is a three-dimensional object, and the inlet is sandwiched between the adhesive paper sheet 61 and the separator 8. FIG. 9(a) depicts a cross-sectional view of the RFID label roll 82 wound in the roll. In FIG. 9(a), the contour of the RFID label roll 82 is depicted with virtual lines and only one RFID label 3 positioned at an end of the outermost circumferential portion of the RFID label roll 82 is depicted with solid lines. As depicted in FIG. 9(a), the total thickness of the RFIC label 3 differs between the portion having therein the inlet 22 and the portion having therein no inlet 22 and there only comprised of the adhesive paper sheet 6 and the separator 8.

FIG. 9(b) depicts an enlarged cross-sectional view of the RFID label 3. The thicknesses of the label base used for a printer generally is material 6 and of the adhesive layer 7 is are within a range of 70 to 100 μm and preferably about 20 μm. In contrast, the thickness of the base material 16 of the inlet 22 is 25 μm for a thin-type one and 100 μm or more for a thick-type one. The thickness of the second adhesive layer 17 that temporarily attaches the inlet 22 and the separator 8 to each other is also about 20 μm and this thickness is substantially added to the total thickness, of the inlet 22. In addition, the thickness of the antenna (which is several μm to several tens of μm) is also added to the total thickness. Although the first adhesive layer 7 applied to the label base material 6 has elasticity and flowability, the first adhesive layer 7 is unable to closely cover the inlet 22 that is thicker than the thickness of the first adhesive layer 7. Therefore, hollow spaces 46a and 46b are formed around the base material 16, which allow no contact between the adhesive layer 7 and the separator 8. The thickness of the IC, not depicted, generally is 100 μm or more and exceeds the thickness of the label base material 6. Therefore, hollow spaces are also formed around the IC.

When the RFID label 3 that is a laminated body is conveyed or is issued after printing thereon by the label printer 150, wrinkles 48a, 48b, and 48c as depicted in FIG. 10 may be formed. Around the circumferential edge of the inlet 22, wrinkles tend to be formed in portions leading the traveling direction (the wrinkle 48a), trailing the travel direction (the wrinkle 48b), and in the vicinity of the IC 19 (the wrinkle 48c). All of these portions are in the vicinities of gap lines along which gaps are generated an the total thickness of the RFID label.

When the printing is executed by the label printer 150 on the portions that have the wrinkles 48a, 48b, and 48c formed therein, normal characters and bar codes cannot be printed on the portions because the printed images are faint. No information can be read from a faint bar code and the function of a label is lost.

Formation of the wrinkles will be described with reference to FIG. 9. The RFID label 3 wound in the roll is curved in an arc as depicted in FIG. 9(a). The hollow spaces 46a and 46b are respectively formed at the head leading end and the trailing end of the inlet 22 in the forward direction of its conveyance. At these portions, the adhesive layer 7 and the separator 8 are not temporarily attached to each other. The label base material 6 in the outermost circumferential portion of the roll and the separator 8 that corresponds to an inner circumferential portion thereof each have a respective length (the circumferential length of the arc corresponding to a specific winding angle) that is different from each other.

When the RFID label 3 is unwound and fed to be flattened out as depicted in FIG. 9(C), the label base material 6 is distorted due to the circumferential length difference between the label base material 6 and the separator 8. The length of the label base material is excessive when the RFID label 3 is flattened out because the length of the label base material 6 is longer than the length of the separator 8. Therefore, a force is generated that causes the label base material 6 to contract in the longitudinal direction. The force generated concentrates on the portions at the hollow spaces 46a and 46b. Therefore, the label base material 6 in these portions is detached and lifted up from the separator 8. These portions lifted up cause the wrinkles 48a and 48B depicted in FIG. 10 to be lifted up. A portion of the label base material 6 is caused to be lifted by a hollow space formed around the IC 19 at the wrinkle 48c.

In addition, even if no wrinkle is formed when the RFID label 3 is unwound and fed because the distortion is relatively small, wrinkles may form when the RFID label continuous body 10 is conveyed. This may occur, for example, in the case when the direction of conveying of the RFID label continuous body 10 is changed using a guide roller having a small diameter in a label manufacturing machine, etc.; where the RFID label continuous body 10 is conveyed sandwiched with a strong force by, for example, nipping rolls; or where the RFID label continuous body 10 is sandwiched by a thermal head and a platen roller and printing and issuance are executed by driving the platen to rotate as in the above label printer in the thermal printing scheme or a label printer in the thermal transfer scheme. In these cases, although no wrinkle is formed immediately after unwinding and feeding the RFID label 3 from the roll, the distorted label base material 6 is squashed by an external force and, as a result, the wrinkles 48 are formed.

SUMMARY OF INVENTION

Technical Problem

The present invention was conceived to solve the above problem. The object of the invention is to provide an RFID label that has no wrinkle formed therein when the RFID label is unwound and fed from a roll or when printing is executed on the RFID label by a label printer, and a manufacturing method of the RFID label.

Solution to Problem

To solve the above problem, the present invention is configured as follows.

The invention concerns an RFID label comprising an adhesive paper sheet that comprises a label base material and a first adhesive layer; an RFID inlet that is formed by disposing an IC and an antenna therefor on one or both sides of a base material, wherein the base material has a smaller area than that of the adhesive paper sheet; a second adhesive layer that is disposed on a side of the RFID inlet, which side is opposite to that side for the adhesive paper sheet; and a separator, laminated therein in the above stated order of elements, wherein for a gap line which is formed across a total thickness of the RFID label acquired by totaling thicknesses of the adhesive paper sheet, the RFID inlet, the second adhesive layer, and the separator and the total thickness differs depending on a disposition of constituent members of the inlet, one or a plurality of cuts each penetrating the separator are formed with each cut at a position at which the cut strides over the gap line or each cut in the vicinity of the gap line.

In another aspect of the invention, the RFID label has a gap line at a circumferential edge of the inlet.

The gap line may be a contour line of the antenna.

The gap line may be a circumferential edge of the IC or a circumferential edge of a supporting member of the IC.

In the RFID label, the cuts are one or plurality of solid lines.

The cuts may be one or a plurality of dotted lines.

Alternatively, the cuts may be one or plurality of curved lines.

In another aspect, the invention concerns an RFID label manufacturing method. The label comprises an adhesive paper sheet that comprises a label base material and a first adhesive layer; an RFID inlet that is formed by disposing an IC and an antenna on one or both sides of a base material, wherein the base material has a smaller area than that of the adhesive paper sheet; a second adhesive layer that is disposed on one side of the RFID inlet, the side is opposite to that for the adhesive paper sheet; and a separator, laminated therein in this order.

The RFID label manufacturing method comprises the steps of unwinding and feeding the separator; attaching at predetermined intervals the RFID inlets each having the second adhesive layer on one side thereof, to a separated face of the separator; covering the RFID inlet by laminating thereon the adhesive paper sheet comprising the label base material and the first adhesive layer; and die-cutting a laminated body acquired at the covering step based on the intervals between the RFID inlets, wherein for a gap line across which there is total thickness of the RFID label acquired by totaling thicknesses of the adhesive paper sheet, the RFID inlet, the second adhesive layer, and the separator differs depending on a disposition of constituent members of the inlet, one or a plurality of cuts each penetrating the separator are formed each at a position at which the cut strides over the gap line or each in the vicinity of the gap line.

In another aspect the gap line is a circumferential edge of the inlet, or is a gap that line is a contour line of the antenna, or is a gap line that is a circumferential edge of the IC or a circumferential edge of a supporting member of the IC.

In another aspect, the cuts are one or plurality of solid lines or the cuts are one or plurality of dotted or broken lines or the cuts are one or plurality of curved lines.

Advantageous Effects of Invention

The RFID label of the present invention may be adapted to tend to have no wrinkles formed thereon that tend to be formed in portions each having a gap in the total thickness of the label such as at the circumferential edge of the inlet incorporated therein or the vicinity of the IC. According to the manufacturing method of an RFID label of the present invention, an RFID label can be produced that also tends to have no wrinkles formed thereon during its issuance from a label printer, in addition to no wrinkle being formed during manufacture of the label. In addition, because no wrinkle is formed during the manufacture of the label or when the RFID label is issued using a label printer, occurrence of failures can be reduced. Therefore, no adhesive paper sheet, etc., are wasted. Therefore, the present invention also contributes to resource saving.

DESCRIPTION OF EMBODIMENTS

Figure 1:
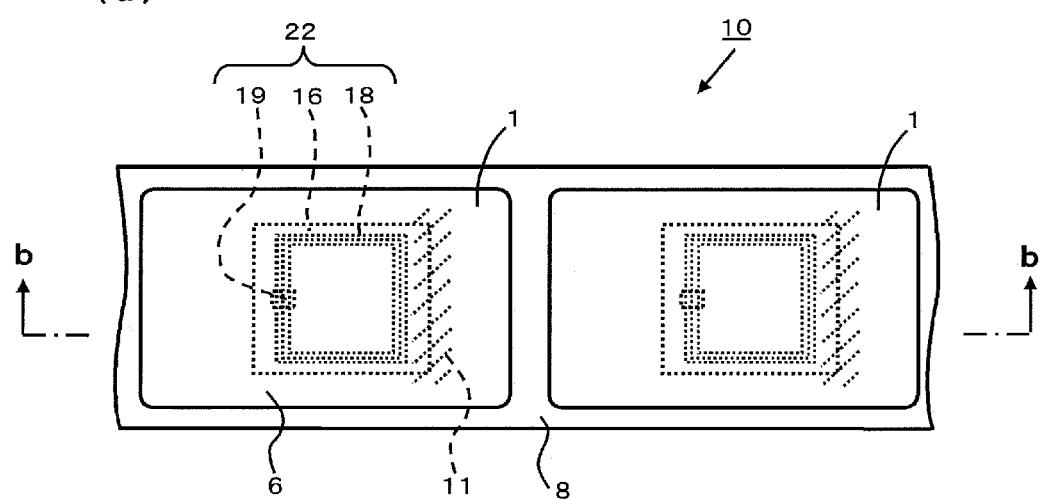
FIG. 1 are respectively a partially-perspective plan view, a cross-sectional view taken along a b-b line and an alternate plan view of an embodiment of an RFID label according to the present invention.
Figure 1:
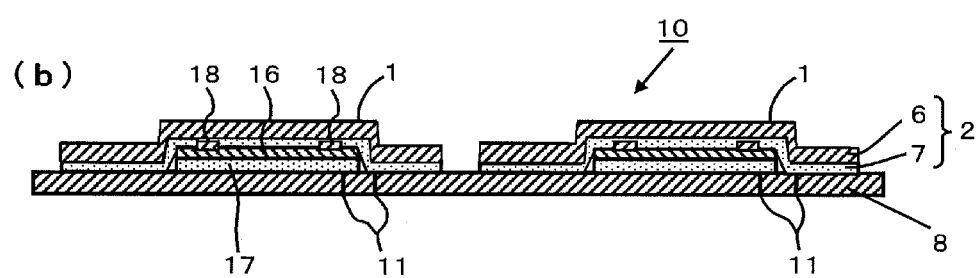
Figure 1:
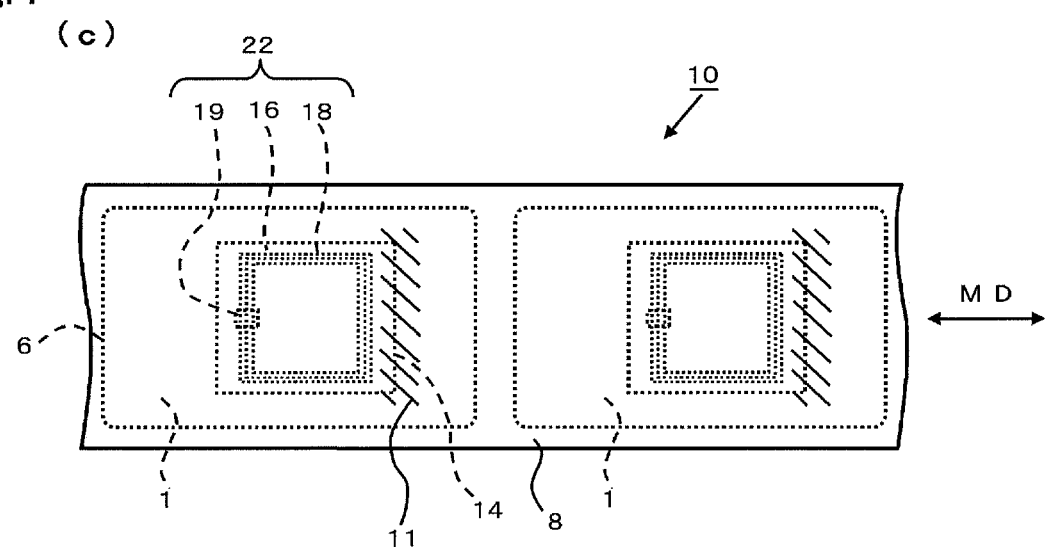

FIG. 1 depict an RFID label 1 of the present invention. FIG. 1(a) is a plan view of an RFID label continuous body 10 and is a diagram of its side for a label base material 6, that is, a front face thereof. FIG. 1(b) is a cross-sectional view of the RFID label continuous body 10 taken along a b-b line. FIG. 1(c) is a plan view of the RFID label continuous body 10 and is a diagram of its side for a separator 8, that is, a back face thereof.

In FIG. 1, the RFID label 1 is a laminated body that is formed by: temporarily attaching through a second adhesive layer 17 an RFID inlet 22 formed by disposing an IC 19 and an antenna 18 on one or both sides of a base material 16, to a separated face of a separator 8; and laminating an adhesive paper sheet 2 including a label base material 6 and a first adhesive layer 7, over the above. The RFID labels 1 are disposed at predetermined intervals along the separator 8, which has a long belt shape to form the RFID label continuous body 10. The size of the adhesive paper sheet 2 is larger than that of the RFID inlet 22 and the adhesive paper sheet 2 overlaps on the whole inlet 22. The inlet 22 is positioned in the vicinity of the center of the adhesive paper sheet 2 and the periphery of the base material 16 is wholly covered with the adhesive paper sheet 2.

The total thickness of the RFID label 1, acquired by totaling the thicknesses of the adhesive paper sheet 2, the RFID inlet 22, the second adhesive layer 17, and the separator 8, differs depending on the disposition of the constituent members of the inlet 22 such as, for example, the base material 16, the antenna 18, the IC 19, and a not depicted supporting member of the IC 19.

The total thickness of the RFID label 1 differs depending on the portion (point) thereof. Therefore, gap lines are present across which the total thickness varies corresponding to the constituent members of the inlet 22. The "gap lines" are, for example, the circumferential edge of the inlet 22 (the circumferential edge of the base material 16), the contour line of the antenna 18, the circumferential edge of the IC 19, and the circumferential edge of the not depicted supporting member. The contour line of the antenna 18 includes the contour of the wiring in addition to the outer circumference and the inner circumference of the antenna.

As depicted in FIG. 1(c), cuts 11 are formed in and penetrate the separator 8, with each cut at a position for the cut 11 to stride a gap line, as described above. FIG. 1(c) depicts an example where a plurality of cuts 11 are formed at a gap line that is at an edge 14 that crosses at a right angle the direction of conveying the RFID label continuous body 10, indicated by an arrow "MD", of the circumferential edge of the base material 16. The cuts 11 are solid lines that are inclined at 45 degrees to the direction MD of conveying the RFID label continuous body 10, and the cuts penetrate only the separator 8.

A manufacturing method of the RFID label 1 of the present invention is described with reference to FIG. 2.

An RFID label manufacturing apparatus 20 is first be described with reference to FIG. 2. The apparatus 20 has a mechanism for feeding and conveying the long separator 8, sequentially laminating the inlet 22 and the adhesive paper sheet 6 on a separated face of the separator 8, and die-cutting the laminated body. The RFID label manufacturing apparatus 20 is comprised of an unwinding unit 30, a cutting process 40, an inlet laminating process 50, an adhesive paper sheet laminating process 60, a die-cutting process 70, a winding unit 80, and a waste winding unit 90, all along a forward direction conveyance path for the separator 8.

A separator roll 32 on which the separator 8 is wound is attached to a supply shaft 31 of the unwinding unit 30.

The cutting process 40 forms the cuts by causing a blade to cut the separator 8. For example, the separator 8 is sandwiched between a roll with a blade referred to as a dicing roll 41 and an anvil roll 42, and the dicing roll 41 is pushed onto the separator 8 and is rotated so that the cuts 11 are formed. The dicing roll 41 is positioned on the separated face side of the separator 8 in FIG. 2. However, the dicing roll 41 may instead be positioned at the position of the anvil roll 42, exchanging their respective positions. The cuts 11 may be formed using a flattening scheme or a laser light beam in addition to using the dicing roll.

The inlet laminating process 50 comprises attaching the inlet 22 from an inlet continuous body 51 to the separator 8. The inlet continuous body 51 is formed by positioning the inlets 22. Each includes an IC 19 that has data stored therein and an antenna 18 that transmits and receives information disposed on one or both sides of the base material 16, on a separator 58 at specific intervals. The inlets 22 are temporarily attached to the separator 58 through the second adhesive layer 17 and are attached to a supply shaft 52 wound in a roll as the inlet continuous body 51. The inlet laminating process 50 uses the supply shaft 52, a guide roller 53, a separating plate 54 that causes the separator 58 to turn at an acute angle and that causes the inlets 22 to separate from the separator 58, a pair of rolls 55 that laminate the inlets 22 on the separator 8, a guide roller 56 that guides the separator 58 after the inlets 22 are separated therefrom, and a take-up shaft 57 that takes up the separator 58, along a path for the inlet continuous body 51 in its forward direction.

The adhesive paper sheet laminating process 60 comprises acquiring an RFID adhesive paper sheet 69 by causing the adhesive paper sheet 2 to adhere to the separator 8. An adhesive raw paper sheet roll 61 is a laminated body including the label base material 6, the second adhesive layer 7, and a separator 68, and is attached to a supply shaft 62 by being wound in a roll. The adhesive paper sheet laminating process 60 uses the supply shaft 62, a roller 63 that causes the separator 68 to turn and separate, a pair of rolls 64 that laminates the adhesive paper sheet 2 on the separator 68 to form an RFID adhesive paper sheet 69, and a take-up shaft 65 that takes up the separator 68 peeled off, along a path for the adhesive raw paper sheet 61 in its forward direction.

The die-cutting process 70 causes a blade to go into the separator 8 from the label-base-material side and cutting the separator 8 into dice. For example, the RFID adhesive paper sheet 69 is sandwiched between a roll with a blade referred to as a dicing roll 71 and an anvil roll 72, and the dicing roll 71 is pushed onto the label base material 6 and is rotated and, to form cutting lines. A pair of waste collecting rolls 73 and 74 that separate label wastes 9 from the adhesive paper sheet 2 are disposed downstream of the dicing roll 71.

The winding unit 80 is a take-up shaft 81 that winds the RFID label continuous body 10 that has completed waste collection and that finishes the RFID continuous body 10 into an RFID label roll 82.

The waste winding unit 90 is a take-up shaft 91 that winds waste 9.

The RFID label continuous body 10 follows a process.

The separator 8 is unwound and fed from the unwinding unit 30. The separator 8 arrives at the cutting process 40 and is sandwiched by the dicing roll 41 and the anvil roll 42 where the cuts 11 are formed (see FIG. 1). The cuts 11 are each formed at a position at which the cuts extend over a line that is estimated to be a gap line when the RFID label 1 is completed, or each cut is formed in the vicinity of a line that is estimated to be a gap line.

The inlet laminating process 50 comprises attaching the inlet 22 to the separated face of the separator 8 through the second adhesive layer 17. The position at which to attach the inlets 22 is based on the positions of the cuts 11.

The laminated body of the separator 8 and the inlet 22 is conveyed to the adhesive paper sheet laminating process 60. The adhesive paper sheet 61 is laminated to the inlet continuous body 51 overlapping thereon through the first adhesive layer 7. The RFID label adhesive paper sheet 69 is acquired by these series of laminating work steps.

The RFID adhesive paper sheet 69 is conveyed to the die-cutting process 70. A blade is caused to go into the RFID adhesive paper sheet 69 from the label-base-material-6 side by the dicing roll 71 and, thereby, the RFID adhesive paper sheet 69 is cut into dice each having a desired size. The waste collecting roll 73 peels off the label waste 9 surrounding the RFID labels 1. The RFID label continuous body 10 is produced that has the RFID labels 1 arranged thereon at specific intervals. After waste collection, the RFID label continuous body 10 is wound by the take-up shaft 81 of the winding unit 80 through a guide roll 29 to form the RFID label roll 82. After waste collection, the label waste 9 is taken up and wound on the take-up shaft 91 of the waste winding unit 90.

Figure 3:
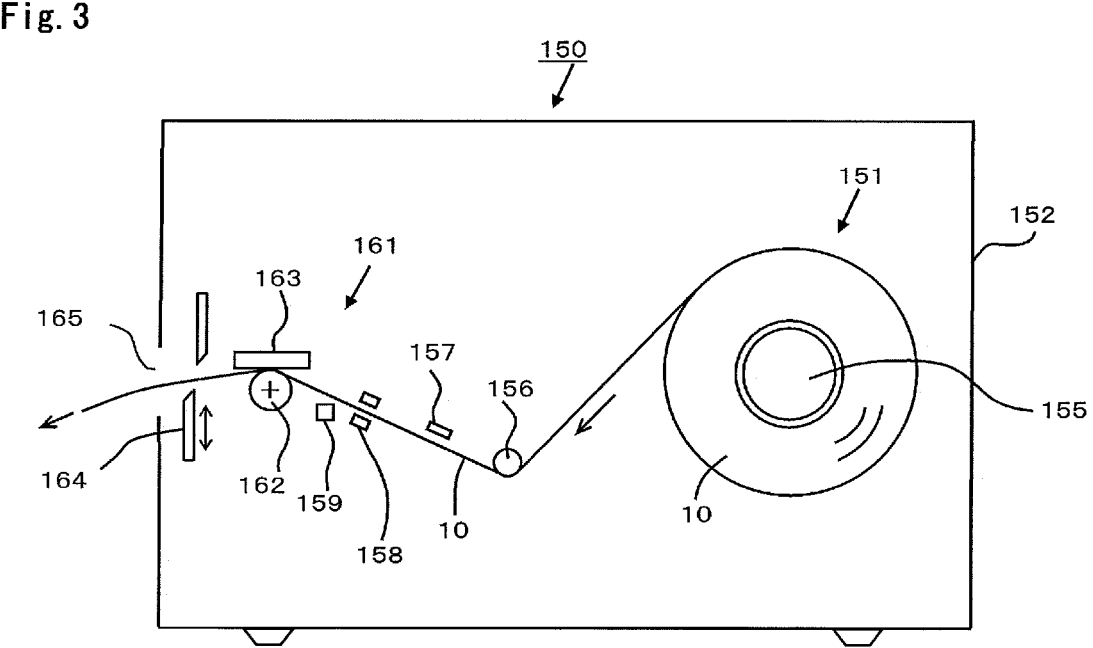
FIG. 3 is a schematic side view of a label printer from which the RFID label issues.

Printing and issuing the RFID label 1 of the present invention using a label printer 150, that is processed as above, will be described with reference to FIG. 3. FIG. 3 is a schematic side view of the thermal RFID label printer 150. However, since the label printer 150 has been described in the description of the "Background Art" and, therefore, the configuration thereof will not be described in detail.

The label continuous body 10 is unwound and fed as a platen roller 162 rotates and that body arrives at a reader/writer 159 through a guide bar 156, a paper sheet sensor 157, and a pitch sensor 158. The RFID label has information recorded thereon by wireless communication. The label continuous body 10 arrives at a printing unit 161 where images such as characters or bar codes are printed on each label 1 by thermal scanning of a thermal head 163. After the printing, the label 1 is discharged from an issuing window 165 to the exterior, along with other labels 1 that are continuously connected thereto or after being cut one by one by a cutter unit 164.

Figure 4:
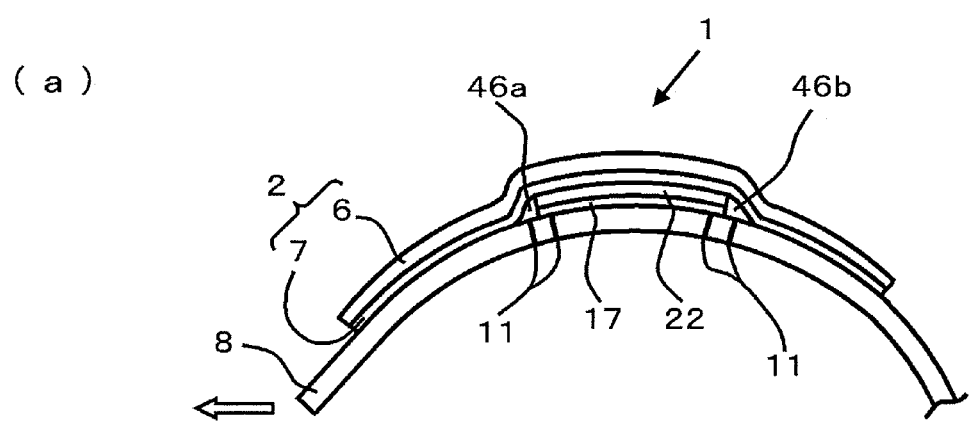
FIGS. 4 a) and b) are explanatory side views of the main parts of the RFID label, explaining a wrinkle protecting action of the RFID label of the present invention.
Figure 4:
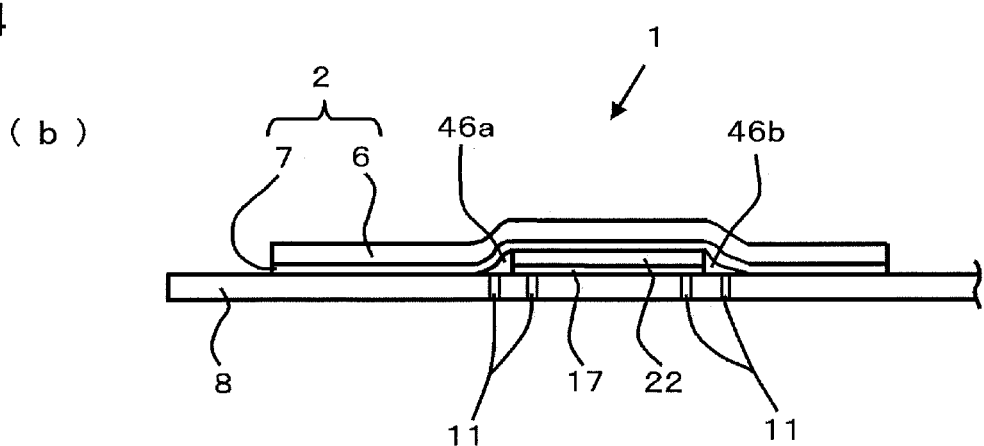
Figure 9:
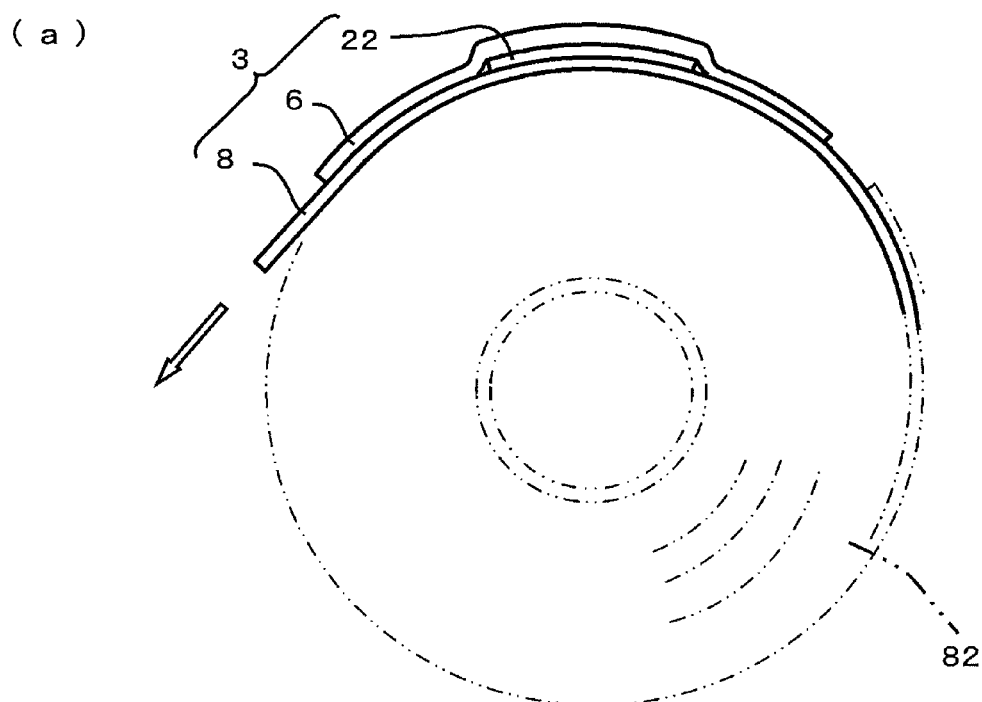
FIG. 9 are cross-sectional views of the conventional RFID label illustrating formation of wrinkles on the RFID label.
Figure 9:
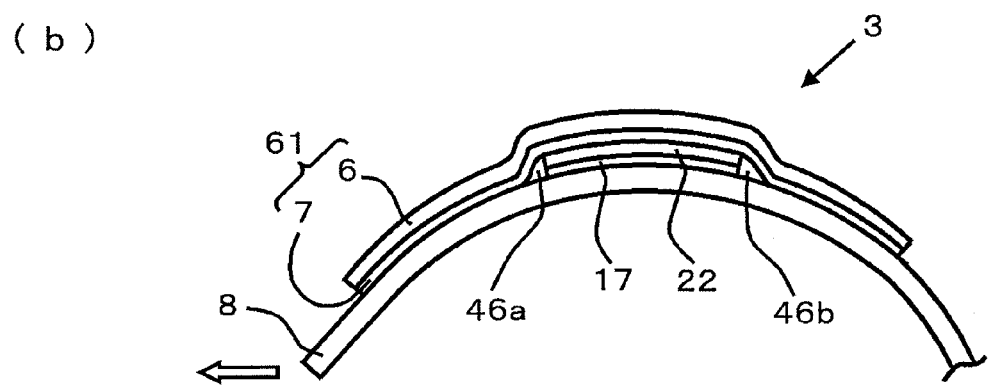
Figure 9:
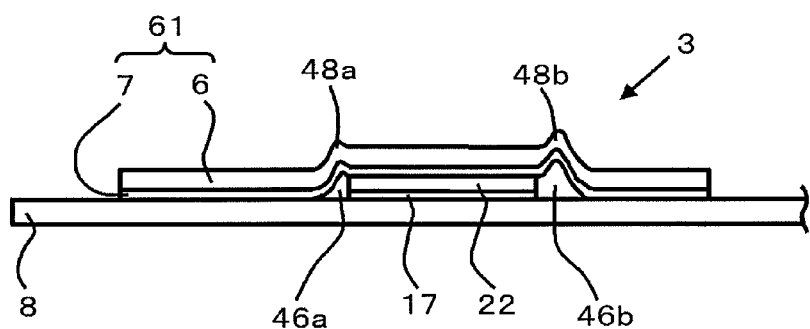
Figure 10:
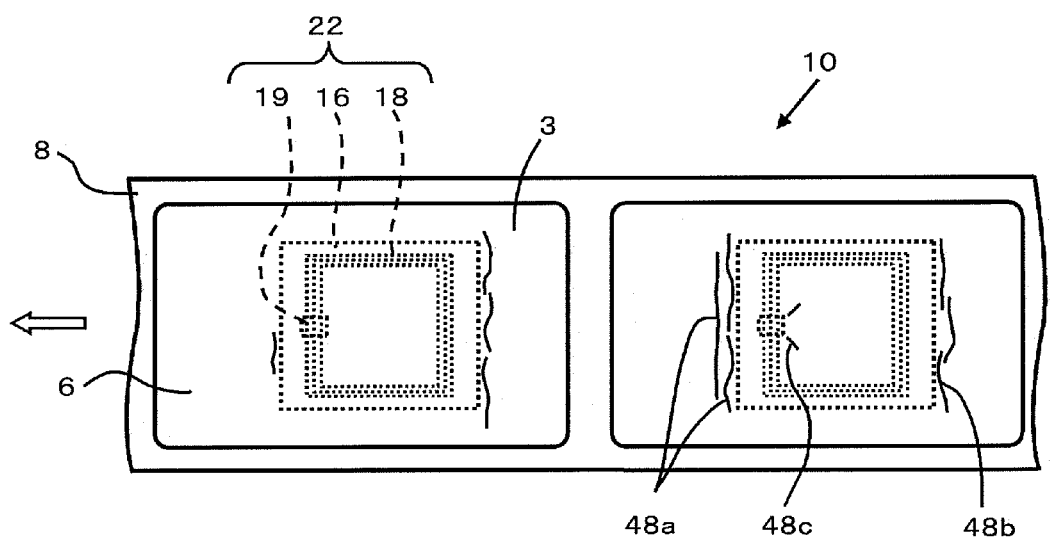
FIG. 10 is a plan view of a conventional RFID label presenting wrinkles formed on the RFID label.

Forming a cut on the separator 8 will be described with reference to FIG. 4. FIG. 4(a) is a cross-sectional view of the RFID label 1 that is curved along the circumference of a winding roll. Hollow regions 46a and 46b are formed respectively along the head and the tail of the inlet 22. The cuts 11 are formed in the portion of the separator 8 in the vicinity of each of the hollow regions 46a and 46b. Other given elements in FIG. 4 have the same reference numerals as those elements have in FIG. 9(b) as above and, therefore, will not again be described. As depicted in FIG. 4(a), the total thickness of the RFID label 1 differs between a portion having the inlet 22 and a portion without the inlet 22 and having only the adhesive paper sheet 6 and the separator 8. The cuts 11 are adjacent to the edge of the inlet 22.

FIG. 4(b) is a cross-sectional view of the state in which the RFID label 1 is unwound and fed to be flattened. When the RFID label 1 is stretched and flattened as above, a distortion is caused because the label base material 6 is longer than the separator 8. However, the cuts 11 formed on the separator 8 open slightly which extends the separator 8, which mitigates the distortion. Therefore, no stress concentrates on the portions of the adhesive paper sheet 2 in the vicinities of hollow regions walls 46a and 46b. Therefore, formation of any wrinkle is prevented.

When the label printer executes the printing and the issuance using the RFID label continuous body 10 in this state, no wrinkle is formed even when the platen roller 162 and the thermal head 163 sandwiches the RFID label continuous body 10 and are driven to rotate, because no lifted portion and no fold are present in the adhesive paper sheet 2.

Therefore, no wrinkle is formed even when the RFID label continuous body 10 is processed using the label manufacturing machine 20 or even when the label printer 150 executes the printing and the issuance. Therefore, the rejection rate is reduced and the consumption of each of paper sheets, films, and an adhesive that are raw materials of the label is reduced. Therefore, the REID label continuous body 10 contributes to saving of resources. In addition, waste produced due to occurrence of failures are reduced.

The kind and the material of the label base material 6 are not particularly limited and are those of material that is commonly used as an adhesive paper sheet such as a paper sheet or a synthesized resin film. An item is also usable such as, for example: a paper base material such as a wood-free paper sheet, a coated paper sheet, or an art paper sheet; a synthesized resin film including as its raw material PET (polyethylene terephthalate), PE (polyethylene), PP (polypropylene), or PS (polystyrene); a sheet formed by combining a plurality of these synthesized resins; or a composite sheet formed by attaching a synthesized resin film and a paper sheet to each other. A heat-sensitive paper sheet (thermal paper sheet) may also be used.

The adhesive used for the adhesive layers 7 and 17 is, for example, an emulsion-based adhesive (formed by dispersing an adhesive in water), a solvent-based adhesive (formed by solving an adhesive into a solvent), or a hot-melt adhesive (that utilizes a thermal plasticity). The raw material of the adhesive can be a synthesized-rubber-based adhesive, a natural-rubber-based adhesive, an acrylic-resin-based adhesive, a polyvinyl-ether-resin-based adhesive, a urethane-resin-based adhesive, or a silicon-resin-based adhesive. The adhesive strength of the adhesive is arbitrary.

The separator 8 is a multi-purpose separator. For example, the separator can be formed by applying to a paper sheet or a film a fluorine-based stripping agent in addition to a UV curing silicone, a thermal curing silicone, a solvent-type silicone, or an alkyl-pendant-polymer.

The inlet 22 is formed by disposing the IC 19 that has information stored therein and an antenna 18 that is connected to the IC 19 and that executes noncontact wireless communication of information, on the surface of a base film 16. In FIG. 1, an inlet using an HF band (13.56 MHz) is exemplified. However, the communication frequency of the inlet 22 is an arbitrary one such as, for example, a UHF band, an HF band (13.56 MHz), or a microwave (2.45 GHz).

The shape of the line of each of the cuts 11 is an arbitrary one and includes, for example, a solid line, a dotted line, a chain line, or a line that has only partially dash-and-point combinations. Any combination of these lines may be used. A straight line, a curved line, or a combination thereof may be used.

Figure 5:
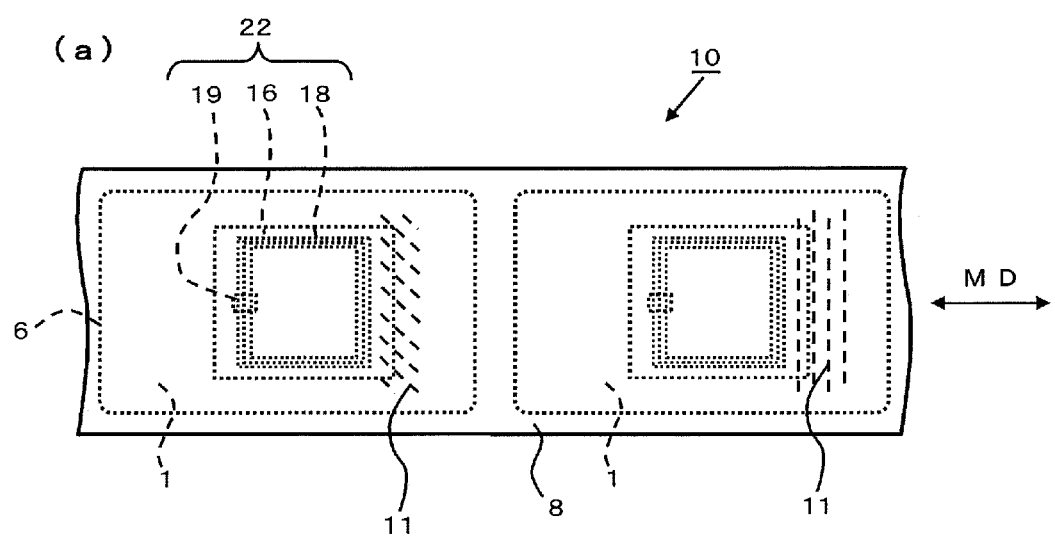
FIGS. 5 a), b) and c) are plan views of other embodiments of the RFID label according to the present invention.
Figure 5:
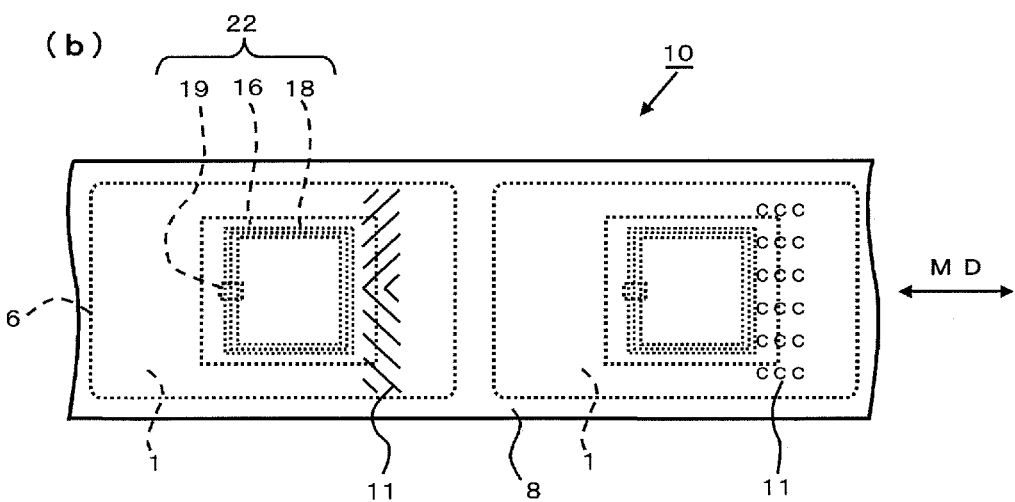
Figure 5:
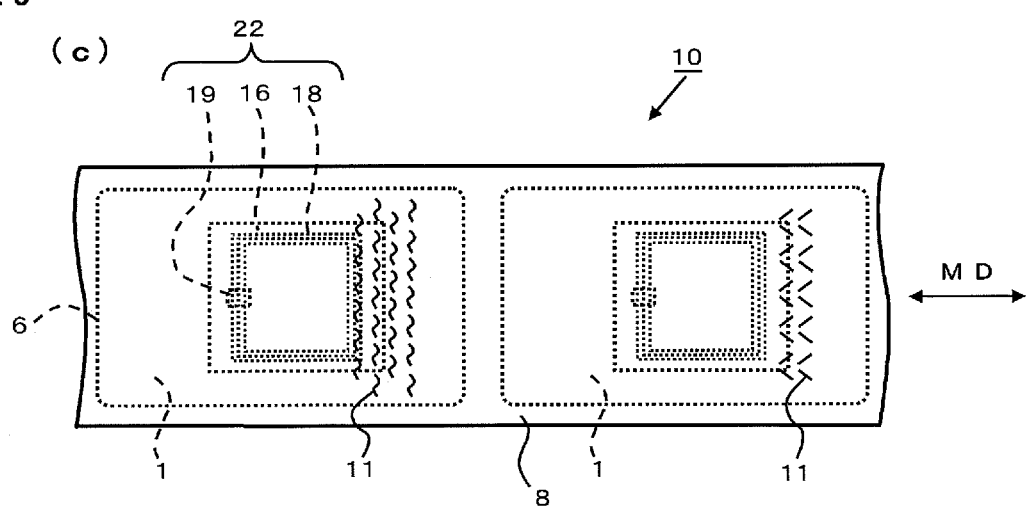
Figure 6:
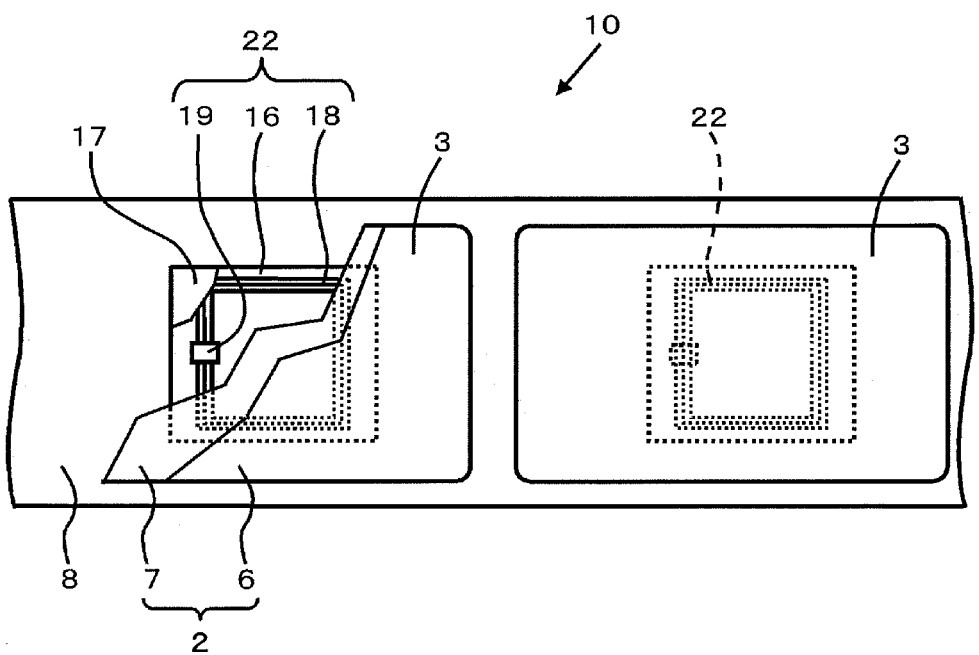
FIG. 6 is a partially-perspective plan view of a conventional RFID label.
Figure 7:
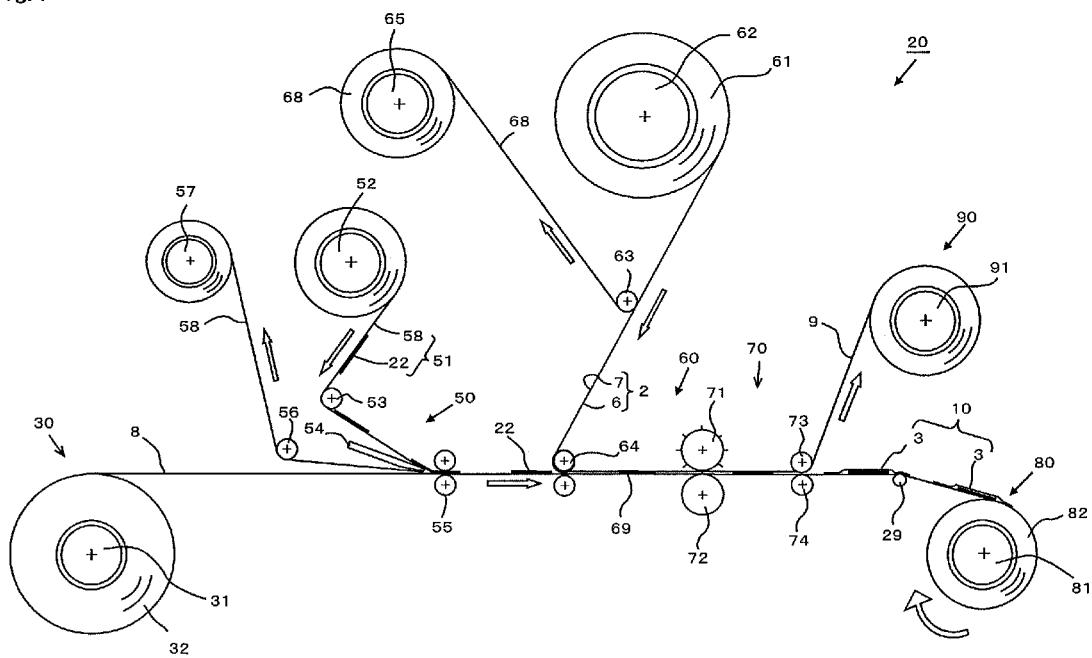
FIG. 7 is a schematic side view of an example of a conventional RFID label manufacturing apparatus.
Figure 8:
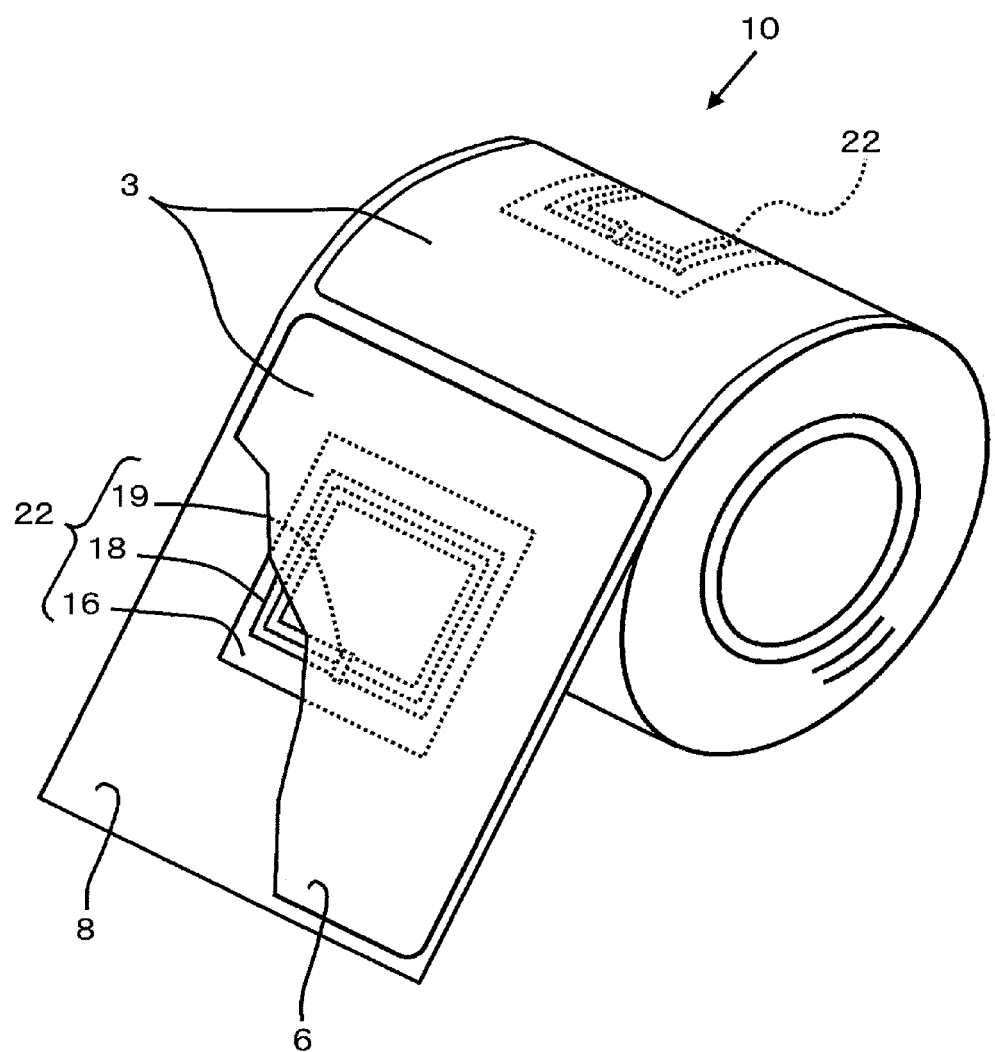
FIG. 8 is a perspective view of a conventional RFID label roll.

One cut 11 or a plurality of cuts 11 may be formed. Lines as the cuts 11 may have a directivity by being arranged in series, in parallel, alternately, or in a grid. Curved lines as the cuts 11 each having a wave shape "~" or an arc shape "C" may be arranged in series, in parallel, or alternately. FIG. 5(a) depicts an example of the cuts 11 that are configured of straight dotted lines. The orientation of the dotted lines is arbitrary and the dotted lines may be disposed inclined or in parallel to the width direction the separator 8. The RFID label 1 in the left portion of FIG. 5(b) is an example where the RFID label 1 is provided with a plurality of solid line cuts 11 and has the cuts 11 arranged thereon with the angle of the cuts 11 in line symmetry with respect to the center line of the label. The right portion of FIG. 5(b) depicts an example wherein the cuts 11 each have an arcuate shape. FIG. 5(c) at the left depicts an example where a plurality of wave-shaped cuts 11 are arranged and at the right an example where the cuts 11 each have a "/" shape or its inverse of this arranged alternately. The shape and the arrangement of the cuts 11 may be arbitrary as above.

When each of the cuts 11 is a straight solid line or a curved solid line that is substantially a straight solid line, preferably, the orientation or the direction of the arrangement of the cuts 11 is inclined from five to 85 degrees against the direction MD of conveyance of the RFID label continuous body 10. The orientation of the inclination may be clockwise or counter-clockwise from direction MD. If the inclination against the conveyance direction is less than five degrees, the degree of opening of each cut is low when the RFID label 1 is unwound and fed and, therefore, no sufficient wrinkle preventing effect can be acquired. When the inclination against the conveyance direction MD exceeds 85 degrees, trouble may arise during manufacture such as that the cuts are opened by a tension that is generated during the manufacturing of the labels and, thereby, the separator 8 is cut off. The most preferable inclination (the angle formed with respect to the conveyance direction MD of the cuts 11) is in a range from 30 to 60 degrees. The cuts 11 depicted in FIG. 1 are a plurality of straight, solid, parallel lines that are inclined by 45 degrees.

Each cut 11 may be positioned to extend over a gap line across which the total thickness of the RFID label varies, or at a position adjacent to a gap line. Otherwise, the positions may each be both of these. One point or a plurality of points may be set as the points to form the cuts on one RFID label. For example, the cut may be formed at only one point in the edge portion of the inlet in the forward traveling direction of the RFID label or the cuts may be formed at a plurality of points in portions including the tail portion of the label and the vicinity of the IC.

It is obvious that the present invention is not limited to the above embodiments, and each embodiment is properly modifiable within the scope of the invention. The number, positions, shapes, dispositions, etc., of the above constituent members are not limited to those of the above embodiments, and any number, positions, shapes, etc., that are preferable for implementing the present invention are employable.

The shapes of the RFID label 1 and the inlet 22 are arbitrary. The described embodiments are examples where the shape of the RFID label 1 is a rectangle elongated in the conveyance direction and the shape of the inlet 22 is a substantial square. However, the shape of the label may be a square or a circle and that of the inlet 22 may be a circle, a rectangle, or a dipole. The combination of the shapes may be arbitrary.

The position of the inlet 22 relative to the RFID label 1 may be arbitrary. The embodiments have been described using an example where the inlet 22 is disposed in the vicinity of the central portion of the RFID label 1. However, that position may be biased toward the conveyance direction or the width direction.

The sizes of the RFID label 1 and the inlet 22, and the ratio of these sizes are also arbitrary.

The number of inlets 22 relative to one RFID label 1 is also arbitrary. A plurality of inlets each using a different communication frequency from each other may be incorporated.

The method of die-cutting is also arbitrary. The label manufacturing machine of FIG. 2 has been described using an example where the dicing roll is used and a half cut and a full cut are formed by changing the height of the blade. However, die-cutting may be executed using a flattening scheme or a laser light beam.

Figure 2:
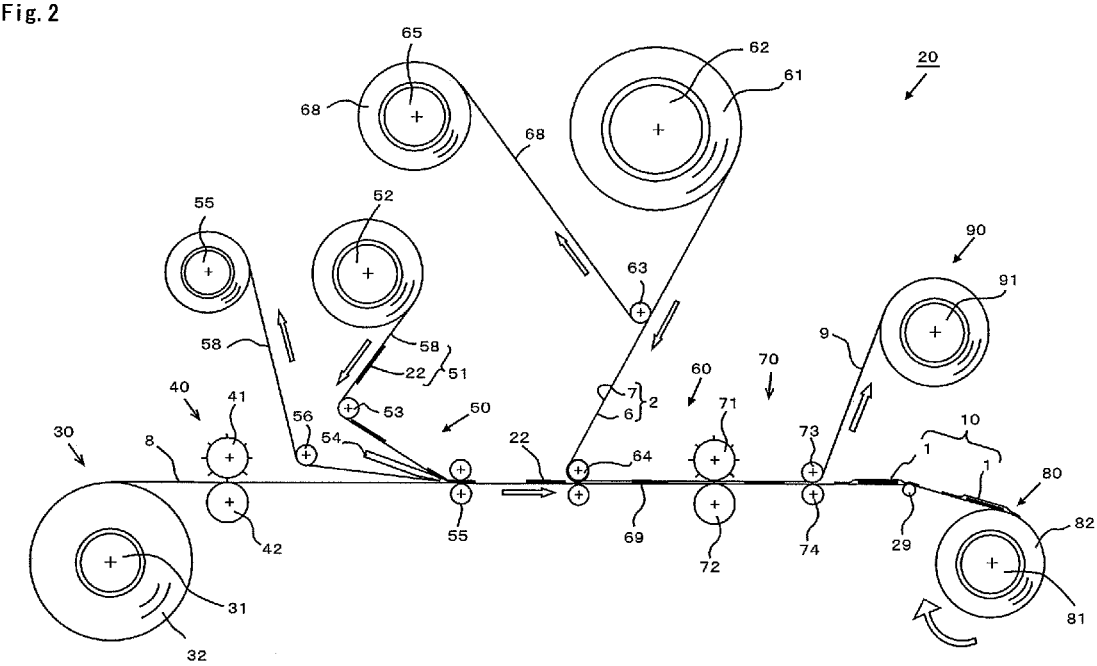
FIG. 2 is a schematic side view of an RFID label manufacturing apparatus according to the present invention.

Manufacture of the RFID label, with reference to FIG. 2, has been described as laminating the adhesive paper sheet 61 to the separator 8 that is temporarily attached with the inlet 22 and as forming the contour of the RFID label 1 by die-cutting downstream the laminating step. However, a label on which the die-cutting is finished and the waste collection is finished and that has a desired size may be produced in advance by the label manufacturing machine. This production is executed by disposing a mechanism that performs the inlet laminating process 50 at the position of the adhesive paper sheet laminating process 60, and attaching the label processed in a predetermined shape to the inlet 22. In this case, the die-cutting process 70 and the waste winding unit 90 are not used.

When this manufacturing method is employed, characters and pictures can also be printed on the label to be laminated on the inlet and, therefore, an RFID label having fixed information printed thereon can also be prepared.

In addition, the separator 68 is peeled off from the adhesive paper sheet 61 and is wound in the manufacturing method of FIG. 2, and the separator 68 wound may be set on the supply shaft 31 and may be reused.

The separator 68 may not be taken up by and wound on the take-up shaft 65, and may instead be returned to the unwinding unit 30 through a plurality of guide rolls not depicted and used as the separator 8. In this case, the separator roll 32 is unnecessary.

The invention claimed is:

1. An RFID label comprising constituent elements laminated in an order and comprising:
    an adhesive paper sheet that comprises a label base material having a side and a first adhesive layer on the side of the label base material;
    an RFID inlet comprising an IC and an antenna on one or both sides of a second base material, the second base material having a smaller area than an area of the adhesive paper sheet;
    a second adhesive layer positioned on a side of the RFID inlet, and the side of the inlet is opposite to the side of the adhesive paper sheet; and
    a separator,
    wherein the RFID label has a total thickness comprising a total thicknesses of the constituent elements, the total thickness varying over an area of the RFID label depending on a disposition of the constituent elements of the RFID inlet,
    the RFID label having a gap line at a portion of the RFID label at which the total thickness of the RFID label changes,
    wherein at least one cut in the separator is formed such that the at least one cut extends over the gap line or extends in vicinity of the gap line.

2. The RFID label of claim 1, wherein the gap line is a circumferential edge of the inlet.

3. The RFID label of claim 1, wherein the gap line is a contour line of the antenna.

4. The RFID label of claim 1, wherein the gap line is a circumferential edge of the IC or a circumferential edge of a supporting member of the IC.

5. The RFID label of claim 1, wherein the at least one cut comprises one or a plurality of solid lines.

6. The RFID label of claim 1, wherein the at least one cut comprises one or a plurality of dotted lines.

7. The RFID label of claim 1, wherein the at least one cut comprises one or a plurality of curved lines.

8. A method of manufacturing an RFID label, comprising constituent elements in the following order:
    an adhesive paper sheet that comprises a first label base material, and a first adhesive layer on the first base material;
    an RFID inlet that is comprised of an IC and an antenna on one or both sides of a second base material, the second base material having a smaller area than the area of the adhesive paper sheet;
    a second adhesive layer that is disposed on one side of the RFID inlet, the one side is opposite to a side of the adhesive paper sheet; and
    a separator laminated therein,
the RFID label manufacturing method comprising the steps of:
    unwinding and feeding the separator;
    at predetermined intervals attaching a plurality of the RFID inlets, each inlet having the second adhesive layer on one side thereof, to a separated face of the separator;
    covering the RFID inlet by laminating thereon the adhesive paper sheet comprising the first label base material and the first adhesive layer for producing a laminated body; and die-cutting the laminated body produced at the covering step and based on the intervals of the RFID inlets along the separation, wherein a total thickness of the RFID label comprises a sum of thicknesses of the constituent elements, the sum of the thicknesses varying depending on a disposition of elements of the RFID inlet; and producing one or a plurality of cuts each at least one cut penetrating the separator, and each at a position at which each cut positioned to extend extends over the gap line or each cut being in a vicinity of the gap line.

9. The RFID label manufacturing method of claim 8, wherein the gap line comprises a circumferential edge of the inlet.

10. The RFID label manufacturing method of claim 8, wherein the gap line comprises a contour line of the antenna.

11. The RFID label manufacturing method of claim 8, wherein the gap line comprises a circumferential edge of the IC or a circumferential edge of a supporting member of the IC.

12. The RFID label manufacturing method of claim 8, wherein each cut comprises one or a plurality of solid lines.

13. The RFID label manufacturing method of claim 8, wherein each cut comprises one or a plurality of dotted lines.

14. The RFID label manufacturing method of claim 8, wherein each cut comprises one or a plurality of curved lines.

15. The RFID label manufacturing method of claim 8, wherein the at least one cut straddles the gap line.

16. The RFID label manufacturing method of claim 8, wherein the at least one cut is transverse to the gap line.

17. The RFID label manufacturing method of claim 8, wherein the at least one cut intersects the gap line at a 45° angle.

18. The RFID label manufacturing method of claim 8, wherein the at least one cut intersects the gap line at an angle in a range of between 30 and 60 degrees.

19. The RFID label of claim 1, wherein the at least one cut straddles the gap line.

20. The RFID label of claim 1, wherein the at least one cut intersects the gap line at an angle in a rage of between 30 and 60 degrees.

* * * * *